United States Patent
Srivastava et al.

(10) Patent No.: US 10,490,318 B2
(45) Date of Patent: Nov. 26, 2019

(54) COATED CONDUCTOR WITH VOLTAGE-STABILIZED INNER LAYER

(71) Applicant: Dow Global Technologies LLC, Midland, MI (US)

(72) Inventors: Yasmin N. Srivastava, Sugar Land, TX (US); Xuming Chen, Katy, TX (US); Timothy J. Person, Pottstown, PA (US)

(73) Assignee: Dow Global Technologies LLC, Midland, MI (US)

( * ) Notice: Subject to any disclaimer, the term of this patent is extended or adjusted under 35 U.S.C. 154(b) by 336 days.

(21) Appl. No.: 14/764,351

(22) PCT Filed: Apr. 3, 2014

(86) PCT No.: PCT/US2014/032778
§ 371 (c)(1),
(2) Date: Jul. 29, 2015

(87) PCT Pub. No.: WO2014/172107
PCT Pub. Date: Oct. 23, 2014

(65) Prior Publication Data
US 2016/0027550 A1 Jan. 28, 2016

Related U.S. Application Data

(60) Provisional application No. 61/813,320, filed on Apr. 18, 2013.

(51) Int. Cl.
*H01B 3/44* (2006.01)
*C08K 5/3492* (2006.01)
(Continued)

(52) U.S. Cl.
CPC .............. *H01B 3/441* (2013.01); *B32B 1/08* (2013.01); *B32B 27/08* (2013.01); *B32B 27/20* (2013.01);
(Continued)

(58) Field of Classification Search
CPC ...... C08K 5/3492; C08K 5/29; C08K 5/3467; H01B 3/30; C09D 123/06; B32B 1/08; B32B 2307/202; B32B 2307/206
(Continued)

(56) References Cited

U.S. PATENT DOCUMENTS 3,552,183 A 1/1971 Heitmann et al.
3,933,772 A 1/1976 Takahashi et al.
(Continued)

FOREIGN PATENT DOCUMENTS

EP 2072576 A1 6/2009
EP 2163576 A1 3/2010
(Continued)

OTHER PUBLICATIONS

EPO machine translation of JP-2005139433-A (Year: 2017).*
(Continued)

*Primary Examiner* — Camie S Thompson

(57) ABSTRACT

Disclosed are polymeric compositions with improved breakdown strength. The polymeric compositions contain a polyolefin and a voltage stabilizing agent, which is selected from one or more of a group of three specific triazine compounds. The present polymeric compositions exhibit improved breakdown strength when applied as an insulating layer for power cable.

8 Claims, 1 Drawing Sheet

(51) Int. Cl.
*C08K 5/00* (2006.01)
*C08K 5/13* (2006.01)
*C08K 5/29* (2006.01)
*C08K 5/3467* (2006.01)
*C09D 123/06* (2006.01)
*H01B 3/30* (2006.01)
*B32B 27/08* (2006.01)
*B32B 27/20* (2006.01)
*B32B 27/32* (2006.01)
*B32B 1/08* (2006.01)

(52) U.S. Cl.
CPC ............... *B32B 27/32* (2013.01); *C08K 5/00* (2013.01); *C08K 5/13* (2013.01); *C08K 5/29* (2013.01); *C08K 5/3467* (2013.01); *C08K 5/3492* (2013.01); *C09D 123/06* (2013.01); *H01B 3/30* (2013.01); *B32B 2264/10* (2013.01); *B32B 2307/202* (2013.01); *B32B 2307/206* (2013.01); *B32B 2307/3065* (2013.01); *B32B 2307/41* (2013.01); *C08K 5/005* (2013.01)

(58) Field of Classification Search
USPC .......... 544/83, 112, 180; 428/375; 174/68.1, 174/119 C, 122 C, 121 SR, 110 PM, 174/137 R
See application file for complete search history.

(56) References Cited

U.S. PATENT DOCUMENTS

| | | |
|---|---|---|
| 4,870,121 A | 9/1989 | Bamji et al. |
| 5,246,783 A | 9/1993 | Spenadel et al. |
| 5,272,236 A | 12/1993 | Lai et al. |
| 5,278,272 A | 1/1994 | Lai et al. |
| 5,719,218 A | 2/1998 | Sarma |
| 5,986,028 A | 11/1999 | Lai et al. |
| 6,455,616 B1 | 9/2002 | Cogen |
| 6,496,629 B2 | 12/2002 | Ma et al. |
| 6,670,554 B1 | 12/2003 | Jow et al. |
| 6,696,154 B2 | 2/2004 | Martinotto et al. |
| 6,714,707 B2 | 3/2004 | Rossi et al. |
| 6,924,435 B2 | 8/2005 | Jow et al. |
| 7,683,113 B2 | 3/2010 | Easter |
| 9,040,828 B2 | 5/2015 | Person et al. |
| 2012/0065307 A1* | 3/2012 | Cogen ............... C08K 5/34924 524/127 |
| 2013/0175070 A1* | 7/2013 | Person ............... C08K 5/3492 174/120 SR |

FOREIGN PATENT DOCUMENTS

| | | | |
|---|---|---|---|
| JP | 2005/139433 | 6/2005 | |
| JP | 2005139433 A * | 6/2005 | |
| WO | 2002/070600 | 9/2002 | |
| WO | 2009/073901 A2 | 6/2009 | |
| WO | 2001/008166 | 1/2011 | |
| WO | 2012/050792 A1 | 4/2012 | |
| WO | WO 2012050792 A1 * | 4/2012 | ........... C08K 5/3492 |
| WO | WO-2012050792 A1 * | 4/2012 | ........... C08K 5/3492 |

OTHER PUBLICATIONS

Englund, Polymer Degradation and Stability, 2009, vol. 94, No. 95, p. 823-833 (XP026063737).
Randall, JMS-Rev. Macromol. Chem. Phys., 1989, C29(2&3), 201-317.
Stein, Journal of Physical Chemistry A, 2002, vol. 106, No. 10, p. 2055-2066.
Yaneff, Journal of Coatings Technology and Research, 2004, vol. 1, No. 3, p. 201-212.
Valet, Progress in Organic Coatings, 1999, vol. 35, No. 1-4, p. 223-233.
PCT/US2014/032778, 20140930, International Search Report and Written Opinion.
PCT/US2014/032778, 20151029, International Preliminary Report on Patentability.

* cited by examiner

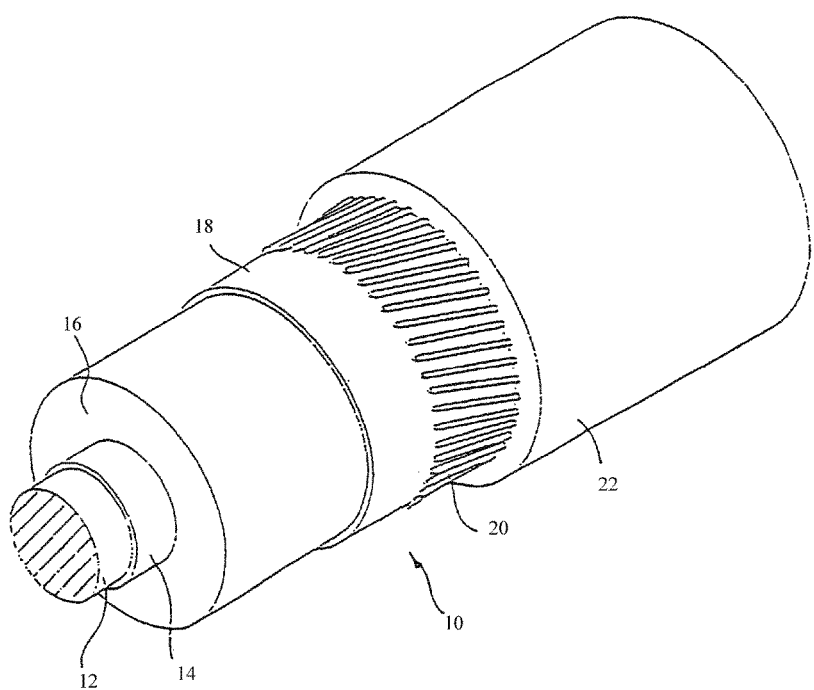

COATED CONDUCTOR WITH VOLTAGE-STABILIZED INNER LAYER

REFERENCE TO RELATED APPLICATIONS

The present application claims the benefit of U.S. Provisional Application No. 61/813,320, filed on Apr. 18, 2013.

BACKGROUND

A typical power cable includes one or more conductors in a cable core surrounded by one or more layers of polymeric material. Medium-voltage (6 to 36 kV), high-voltage (greater than 36 kV), and extra-high-voltage (greater than 220 kV) cables typically include a core surrounded by an inner semiconducting layer, followed by an insulating layer, and then an outer semiconducting layer, and an outermost layer (or sheath).

The load-carrying capacity of a cable system is limited, in part, by the heat transfer away from the conductor. Polyolefins, such as polyethylene, are frequently utilized in the insulating layer and/or in the semiconducting layer. Polyethylene has a low dielectric permittivity and a relatively high electrical breakdown strength.

Known are voltage-stabilizing agents for polyolefin compositions that increase electrical breakdown strength of insulating layers in power cable. Conventional voltage-stabilizing agents (such as the family of polycyclic aromatics, e.g. acenes), however, have poor compatibility with polyolefins. The art recognizes the continuous need for voltage-stabilizing agents compatible with polyolefins for (i) increased electrical breakdown strength of cable insulation material, (ii) increased reliability with existing cable designs and/or (iii) provision of high-stress designs that are able to deliver increased amounts of energy.

SUMMARY

One embodiment is a coated conductor comprising:
a conductor;
an outermost opaque layer;
an inner layer located between the conductor and the outermost layer, the inner layer comprising a polymeric composition, which comprises:
a polyolefin; and
a triazine selected from the group consisting of compounds having one of the structures (I), (II), or (III), and combinations of two or more thereof:

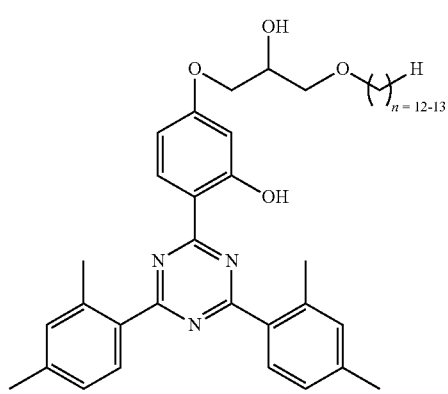

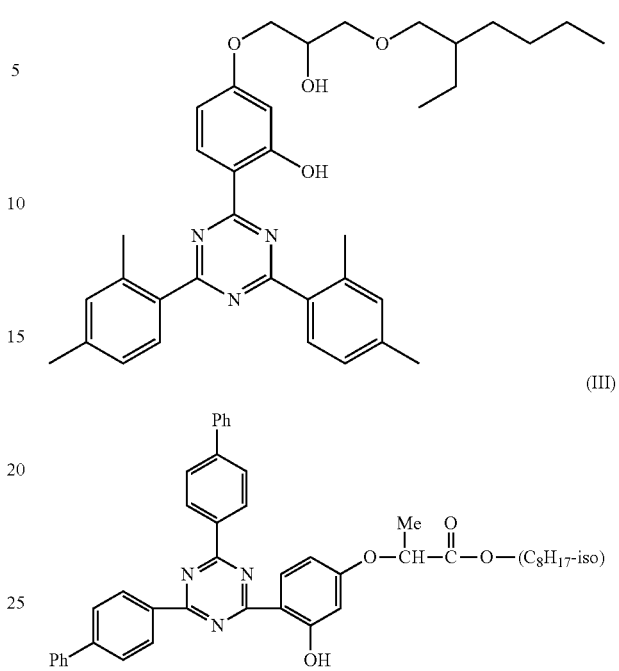

BRIEF DESCRIPTION OF THE DRAWINGS

The FIGURE is a perspective view of a power cable in accordance with an embodiment of the present disclosure.

DETAILED DESCRIPTION

The present disclosure provides a polymeric composition. The polymeric composition includes (i) a polymeric component, (ii) a voltage-stabilizing agent, and (iii) optionally other additives. The present disclosure further provides coated conductors comprising such polymeric compositions.

Polymeric Component

The polymeric component may include thermoplastics and/or thermoset material (such as silicone rubber). The polymeric component may be crosslinked or may be non-crosslinked. Nonlimiting examples of suitable thermoplastics include, polyurethanes, polyolefins, polyacetals, polycarbonates, vinyl polymers, polyamides, polyimides, acrylics, polystyrenes, polysulfones, polyetherketones, cellulosics, polyesters, polyethers, fluoropolymers, and copolymers thereof such as olefin-vinyl copolymers, olefin-allyl copolymers and copolymers of polyethers and polyamides. Examples of vinyl polymers include polyvinyl chloride, polyvinyl acetate, vinyl chloride/vinyl acetate copolymers, polyvinyl alcohol and polyvinyl acetal.

When it is desired to use a crosslinked polymeric component, crosslinking can be accomplished by one or more of the following nonlimiting procedures: free radical crosslinking (e.g., peroxide cross-linking); radiation cross-linking (e.g., electron accelerators, gamma-rays, high energy radiation, such as X-rays, microwaves, etc.); thermal crosslinking, and/or moisture cure crosslinking (e.g., silane-graft).

In an embodiment, the polymeric component is a polyolefin. Nonlimiting examples of suitable polyolefins are homopolymers and copolymers containing one or more $C_2$-$C_{20}$ α-olefins. For purposes of this disclosure, ethylene is considered an α-olefin. Nonlimiting examples of suitable α-olefins include ethylene, propylene, isobutylene, 1-butene, 1-pentene, 1-hexene, 4-methyl-1-pentene, and 1-octene. Nonlimiting examples of suitable polyolefins include ethylene-based polymer, propylene-based polymer, and combinations thereof. An "ethylene-based polymer", or "polyethylene" and like terms is a polymer containing at least 50 mole percent (mol %) units derived from ethylene. A "propylene-based polymer," or "polypropylene" and like terms is a polymer containing at least 50 mole percent units derived from propylene.

In an embodiment, the polymeric component is an ethylene-based polymer. The ethylene-based polymer may be ethylene homopolymer or an ethylene/α-olefin interpolymer. The α-olefin content is from about 5, or about 10, or about 15, or about 20, or about 25, wt % to less than 50, or less than about 45, or less than about 40, or less than about 35, wt % based on the weight of the interpolymer. The α-olefin content is measured by $^{13}C$ nuclear magnetic resonance (NMR) spectroscopy using the procedure described in Randall (*Rev. Macromol. Chem. Phys., C29* (2&3)). Generally, the greater the α-olefin content of the interpolymer, the lower the density and the more amorphous the interpolymer, and this can translate into desirable physical and chemical properties for the protective insulation layer.

The α-olefin is a $C_{3-20}$ linear, branched or cyclic α-olefin. Nonlimiting examples of suitable of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this disclosure certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this disclosure. Nonlimiting examples of suitable ethylene-based polymers include the following copolymers: ethylene/propylene, ethylene/butene, ethylene/1-hexene, ethylene/1-octene, ethylene/styrene, ethylene-vinyl acetate, ethylene-vinyl propionate, ethylene-vinyl isobutyrate, ethylene-vinyl alcohol, ethylenemethyl acrylate, ethylene-ethyl acrylate, ethylene-ethyl methacrylate, ethylene/butyl-acrylate copolymers (EBA), ethylene-allyl benzene, ethylene-allyl ether, and ethylene-acrolein; ethylene-propylene (EPR) or ethylene-propylene-diene (EPDM) rubbers; natural rubbers; butyl rubbers and the like.

Nonlimiting examples of suitable terpolymers include ethylene/propylene/1-octene, ethylene/propylene/butene, ethylene/butene/1-octene, ethylene/propylene/diene monomer (EPDM) and ethylene/butene/styrene. The copolymers/interpolymers can be random or blocky.

The ethylene-based polymer can be high-density polyethylene (HDPE), medium-density polyethylene (MDPE), low-density polyethylene, (LDPE), linear-low-density polyethylene (LLDPE), and/or very-low-density polyethylene (VLDPE). The ethylene-based polymers used in the practice of this disclosure can be used alone or in combination with one or more other ethylene-based polymers, e.g., a blend of two or more ethylene-based polymers that are "different from one another," which means the ethylene-based polymers are uncommon by way of at least one property such as: monomer/comonomer composition and content, melt index, melt temperature, degree of branching, catalytic method of preparation, etc. If the ethylene-based polymer is a blend of two or more ethylene-based polymers, then the ethylene-based polymers can be blended by any in-reactor or post-reactor process. The reactors can be charged with the same catalyst but operated at different conditions, e.g., different reactant concentrations, temperatures, pressures, etc, or operated at the same conditions but charged with different catalysts.

Examples of ethylene-based polymers made with high pressure processes include (but are not limited to) low-density polyethylene (LDPE), ethylene vinyl acetate copolymer (EVA), ethylene ethyl acrylate copolymer (EEA), and ethylene silane acrylate terpolymers.

Nonlimiting examples of ethylene-based polymers include very-low-density polyethylene (VLDPE) (e.g., FLEXOMER® ethylene/1-hexene polyethylene made by The Dow Chemical Company), homogeneously branched, linear ethylene/α-olefin copolymers (e.g., TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and ethylene block copolymers (e.g., INFUSE® polyethylene available from The Dow Chemical Company). Substantially linear ethylene copolymer is described in U.S. Pat. Nos. 5,272,236, 5,278,272 and 5,986,028.

Voltage-Stabilizing Agent

In addition to the polymeric component, the polymeric composition also includes a voltage-stabilizing agent (or VSA). A "voltage-stabilizing agent," as used herein, is a compound which reduces the damage to a polymeric material when exposed to an electric field. It has been considered that a VSA may trap or deactivate electrons to inhibit electrical treeing in an insulation material, or otherwise to provide effective screening of high localized fields (near defects or contaminants) to thereby reduce the energy and/or frequency of injected electrons which may impart damage to the polyolefin. Blending the VSA with the polymeric component inhibits or otherwise retards treeing. Bounded by no particular theory, it is believed the VSA fills and/or surrounds defects in the polymeric component, the defects being points of tree initiation. Defects include voids and/or impurities present in the polymeric component.

The VSA is a triazine selected from one or more of the compounds having the following structures:

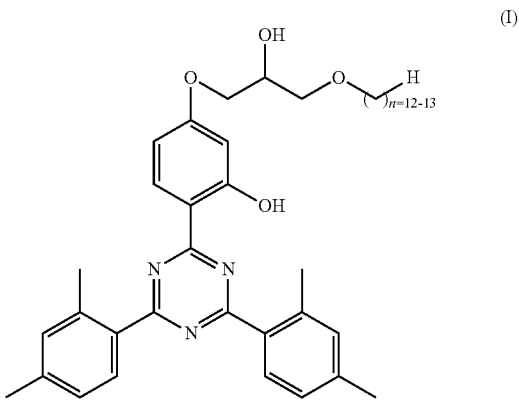

(I)

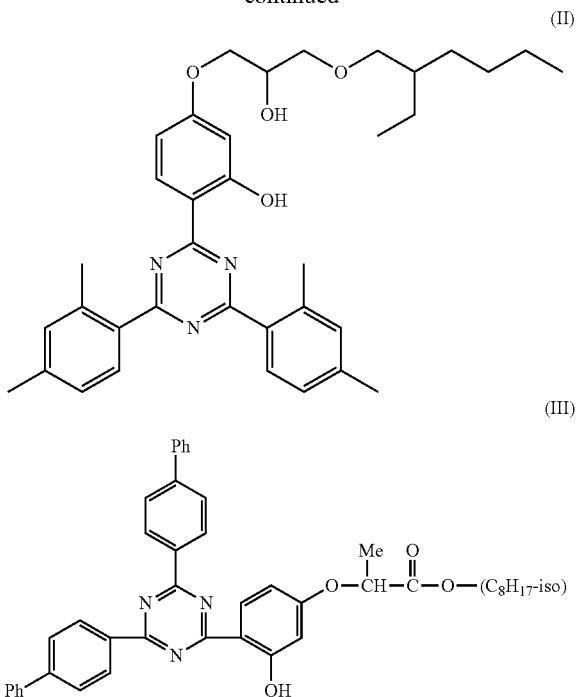

a) In an embodiment, the polymeric composition contains from about 0.1 wt %, or about 0.2 wt % to about 5 wt %, or about 3 wt %, or about 1 wt % of the VSA.

b) In an embodiment, the VSA can be a mixture of two or three different triazines of the structures (I) through (III).

c) The foregoing VSAs unexpectedly improve direct current ("DC") breakdown strength in insulating layers containing the present polymeric compositions. The improvement in DC breakdown strength can be seen in the increased DC breakdown strengths exhibited in Examples 1-3 described hereafter.

Moreover, the present VSAs exhibit good solubility in the polyolefin matrix and a low migration tendency. The present VSAs can be utilized effectively with other components of the polymeric composition, in particular to cross-linking agents.

In various embodiments, the polymeric compositions containing one or more of the above VSAs can have a DC breakdown strength of at least 400 kV/mm, at least 425 kV/mm, or at least 450 kV/mm, and up to 700 kV/mm, 650 kV/mm, 600 kV/mm, or 550 kV/mm. DC breakdown strength is determined according to the procedure provided in the Test Methods section, below. In an embodiment, the polymeric composition can have a DC breakdown strength in the range of from 467 to 543 kV/mm.

In an embodiment, the polymeric compositions containing one or more of the above VSAs can have a DC breakdown strength that is at least 5%, at least 10%, at least 15%, or at least 20% greater than a comparative polymeric composition having the same composition but lacking the VSA. In an embodiment, the polymeric composition containing one or more of the above VSAs can have a DC breakdown strength that is in the range of from 10% to 40%, or from 13% to 32% greater than a comparative polymeric composition having the same composition but lacking the VSA.

Additives

Any of the foregoing polymeric compositions may optionally contain one or more additives. Nonlimiting examples of suitable additives include antioxidants, stabilizers, processing aids, scorch retarders, and/or cross-linking boosters. As antioxidant, sterically hindered or semi-hindered phenols, aromatic amines, aliphatic sterically hindered amines, organic phosphites, thio compounds, and mixtures thereof, can be mentioned. Typical cross-linking boosters may include compounds having a vinyl or an allyl group, e.g. triallylcyanurate, triallylisocyanurate, and di-, tri- or tetra-acrylates. As further additives, flame retardant additives, acid scavengers, inorganic fillers, water-tree retardants and other voltage stabilizers can be mentioned A "scorch retarder," as used herein is a compound that reduces the formation of scorch during extrusion of a polymer composition, at typical extrusion temperatures used, when compared to the same polymer composition extruded without said compound. Besides scorch retarding properties, the scorch retarder may simultaneously result in further effects like boosting, i.e. enhancing cross-linking performance during the cross-linking step.

The polymeric composition may comprise two or more embodiments disclosed herein.

Coated Conductor

The present disclosure provides articles containing the present polymeric compositions. In an embodiment, the article includes a conductor and a coating on the conductor. This forms a coated conductor. The conductor may be a single cable or a plurality of cables bound together (i.e., a cable core, or a core). The coated conductor may be flexible, semi-rigid, or rigid. Nonlimiting examples of suitable coated conductors include flexible wiring such as flexible wiring for consumer electronics, a power cable, a power charger wire for cell phones and/or computers, computer data cords, power cords, appliance wiring material, and consumer electronic accessory cords.

A coating is located on the conductor. The coating may be one or more inner layers such as an insulating layer and/or a shielding layer and/or a semiconducting layer. The coating may also include one or more outer layer(s) (also referred to as a "jacket" or a "sheath"). The coating includes any of the present polymer compositions as disclosed herein. As used herein, "on" includes direct contact or indirect contact between the coating (or a layer) and the conductor. "Direct contact" is a configuration whereby the coating immediately contacts the conductor, with no intervening layer(s) and/or no intervening material(s) located between the coating and the conductor. "Indirect contact" is a configuration whereby an intervening layer(s) and/or an intervening structure(s) or material(s) is/are located between the conductor and the coating. The coating may wholly or partially cover or otherwise surround or encase the conductor. The coating may be the sole component surrounding the conductor. Alternatively, the coating may be one layer of a multilayer structure, jacket, or sheath encasing the metal conductor.

In an embodiment, a coated conductor is provided and includes a conductor, an inner layer and an outermost opaque layer (or sheath). The outermost opaque layer is the exposed layer or the layer in contact with the ambient environment. The inner layer is located between the conductor and the outermost layer. In other words, the inner layer is not exposed to the ambient environment, and/or is not exposed to sunlight. The inner layer includes the polymeric composition containing polyolefin and the VSA as disclosed above. The VSA can be any triazine of structure (I), (II), (III), or a blend of two different triazines as disclosed herein.

In an embodiment, the inner layer (containing polyolefin and VSA) excludes layer(s) exposed to sunlight.

In an embodiment, the polymeric composition of the inner layer contains a polyethylene.

In an embodiment, the polymeric composition of the inner layer contains a crosslinked polyethylene.

In an embodiment, the coated conductor is a power cable operating at a voltage greater than 1 kV, or greater than 6 kV to 36 kV (medium voltage), or greater than 36 kV (high voltage), or greater than 220 kV (extra high voltage). The FIGURE shows an insulated power cable 10 (i.e., a coated conductor) which includes a metallic conductor 12, an internal shielding layer 14, an insulating layer 16, an external shielding layer 18, a metallic screen 20 of wound wires or conducting bands, and an outermost layer 22 (also known as a sheath). The outermost layer 22 is opaque.

In an embodiment, the internal shielding layer 14 and/or the insulating layer 16 and/or the external shielding layer 18 are/is composed of a polymeric composition containing polyethylene and triazine of the structure (I), (II), and/or (III). In other words, the inner layer can be an insulating layer and/or a shielding layer, one or both of which contain the present polymeric composition.

The present coated conductor may comprise two or more embodiment disclosed herein.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The "DC breakdown strength" of an insulator is the minimum voltage that causes a portion of an insulator to become electrically conductive, measured according to the procedure provided in the Test Methods section, below.

"Cable" and like terms is at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components. The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

A "conductor" is an element of elongated shape (wire, cable, fiber) for transferring energy at any voltage (DC, AC, or transient). The conductor is typically at least one metal wire or at least one metal cable (such as aluminum or copper) but may include optical fiber.

"Crosslinked," "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

An "insulating layer" is a layer having a volume resistivity greater than $10^{10}$ ohm-cm, or greater than $10^{12}$ ohm-cm.

A "layer," as used herein, is a polymer-based layer surrounding the conductor, for example, an electrically insulating layer, a semiconductive layer, a sheath, a protective layer, a water blocking layer, or a layer performing combined functions, for example, a protective layer charged with a conductive filler.

The term "medium voltage" generally means a voltage of between 6 kV and about 36 kV, whereas "high voltage" means voltages higher than 36 kV, and "extra high voltage" generally means voltages greater than 220 kV. The skilled artisan understands that these general voltage ranges may be different outside of the United States.

The term "opaque," as used herein, is a material that blocks at least natural light (i.e., sunlight). In other words, an opaque material is impenetrable to light energy having a wavelength from about 250 nm to about 800 nm.

The term "polymer" is a macromolecular compound prepared by polymerizing monomers of the same or different type. "Polymer" includes homopolymers, copolymers, terpolymers, interpolymers, and so on. The term "interpolymer" is a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

A "shielding layer" may be semiconductive or resistive. A shielding layer having semiconductive properties has a volumetric resistivity value, of less than 1000 Ω-m, or less than 500 Ω-m, when measured at 90° C. A shielding layer having resistive properties has a volumetric resistivity value greater than a semiconductive layer. A shielding layer having resistive properties typically has a dielectric constant greater than about 10.

Test Methods

DC Breakdown Strength Measurement

The DC breakdown strength measurements are performed using an apparatus utilizing a rounded 0.25" probe and a large flat copper plate. For each test the voltage is raised at a rate of 300 V/s until a breakdown is detected. "Breakdown" is defined as the point where the voltage read by the power source suddenly drops to below 10% of the set value. This method is chosen as opposed to current spike measurements to eliminate false positives from static discharge. This DC breakdown test procedure is very similar to ASTM D149 (for AC tests) with considerations from ASTM D3755 (for DC tests). The DC breakdown strength is the voltage at which the sample failed normalized to thickness. The ASTM method suggests five measurements per sample for an adequate standard deviation; however, early tests here revealed that the standard deviation does not level until approximately ten tests, while the standard error continues to drop further. As a compromise between standard error and time, ten measurements are made for each sample, and an average value is provided as the DC breakdown strength of the material.

EXAMPLES

Sample Preparation

PE resin containing certain amount of additive is first dry blended, and then the mixture is melt-blended on a micro 18-mm twin-screw extruder at a speed of ~200 RPM. The throughput is 7 lb/h with a melt temperature of about 180-200° C. The extruded strand is air-cooled and chopped into pellets.

PE films containing certain amount of additives are fabricated by using a single screw extruder. The films are casted at temperature in the range of 170-210° C. along the extruder. The Die Gap is set as 4 mm and Chill Roll Temperature is 40° C. The film thickness is around 1-2 mils.

Examples 1-3 and Comparative Samples A-C

Example 1 is LDPE containing 1 wt % of the following triazine voltage-stabilizing agent, which is an 85 wt % solution in 1-methoxy-2-propanol:

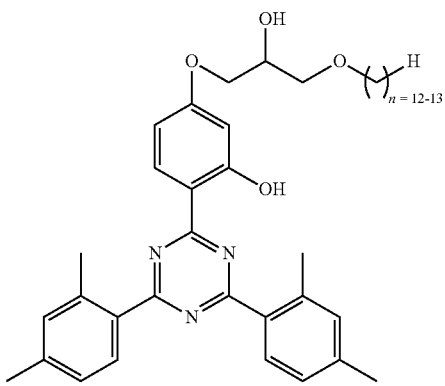

which is available under the brand name TINUVIN™ 400 from BASF. The LDPE employed in this example is LDPE DXM446 from The Dow Chemical Company, Midland, Mich., USA.

Example 2 is LDPE containing 1 wt % of the following triazine voltage-stabilizing agent:

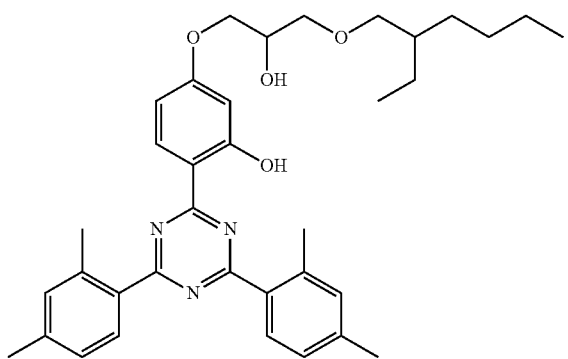 [SMILES: CCCCC(CC)COCC(O)COc1ccc(-c2nc(-c3ccc(C)cc3C)nc(-c3ccc(C)cc3C)n2)c(O)c1]

which is available under the brand name TINUVIN™ 405 from BASF. The LDPE employed in this example is the same as described in Example 1.

Example 3 is LDPE containing 0.85 wt % of the same voltage-stabilizing agent employed in Example 2. The LDPE employed in this example is the same as described in Example 1.

Example 4 is LDPE containing 1 wt % of the following triazine voltage-stabilizing agent:

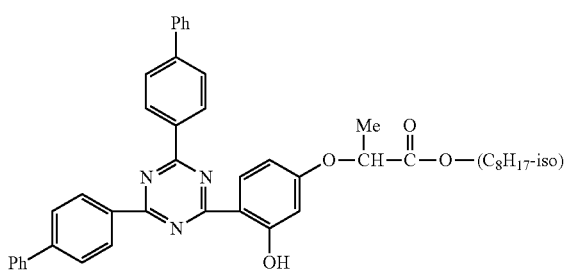

which is available under the brand name TINUVIN™ 479 from BASF. The LDPE employed in this example is the same as described in Example 1.

Comparative Sample A is LDPE with no voltage-stabilizing agent. The LDPE employed in Comparative Sample A is the same as described in Example 1.

Comparative Sample B is LDPE containing 1 wt % CYASORB™ UV 1164, having the structure:

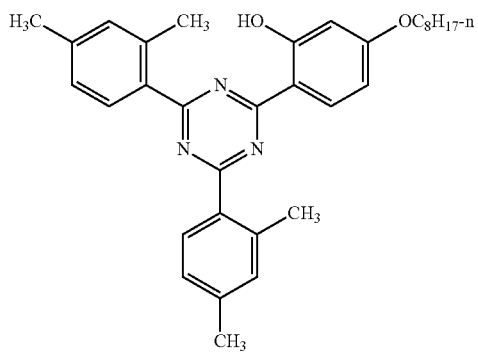

The LDPE employed in Comparative Sample B is the same as described in Example 1.

Comparative Sample C is LDPE containing 1 wt % CHIMASSORB™ 944, a hindered amine stabilizer having the structure:

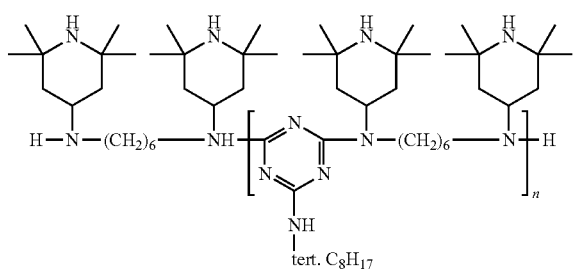

The LDPE employed in Comparative Sample C is the same as described in Example 1.

Examples 1-3 and Comparative Samples A-C are analyzed for DC breakdown strength according to the above-described procedure. Results are provide in Table 1, below:

TABLE 1

Breakdown Strength Analysis

| Samples | Additive name | Average DC Breakdown strength, (KV/mm) | % Breakdown strength improvement |
|---|---|---|---|
| Comparative Sample A | None | 412.381 | — |
| Comparative Sample B | CYASORB ™ UV1164 | 369.303 | −10.4 |
| Comparative Sample C | CHIMASSORB ™ 944 | 374.199 | −9.3 |
| Example 1 | TINUVIN ™ 400 | 495.295 | 20.1 |
| Example 2 | TINUVIN ™ 405 | 467.058 | 13.3 |
| Example 3 | 0.85% TINUVIN ™ 405 | 507 | 22.9 |
| Example 4 | TINUVIN ™ 479 | 542.3 | 31.5 |

Breakdown strength results indicate that special/unique triazine type structures TINUVIN™ 400, 405, and 479 provide significant DC voltage stabilization performance compared with other triazine structures, such as CYASORB™ UV 1164 and CHIMASSORB™ 944.

It is specifically intended that the present disclosure not be limited to the embodiments and illustrations contained herein, but include modified forms of those embodiments including portions of the embodiments and combinations of elements of different embodiments as come within the scope of the following claims.

We claim:
1. A coated conductor comprising:
   a conductor;
   an outermost opaque layer;
   an inner layer located between the conductor and the outermost layer, the inner layer comprising a polymeric composition, which comprises:
   a low-density polyethylene; and
   a triazine selected from the group consisting of compounds having one of the structures (I), (II), or (III), and combinations of two or more thereof:

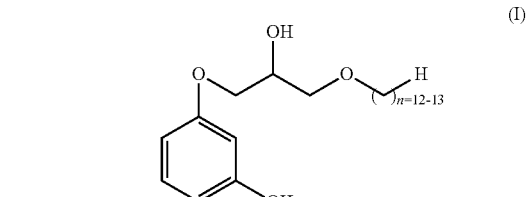

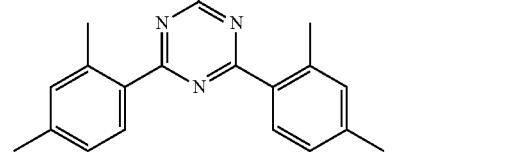

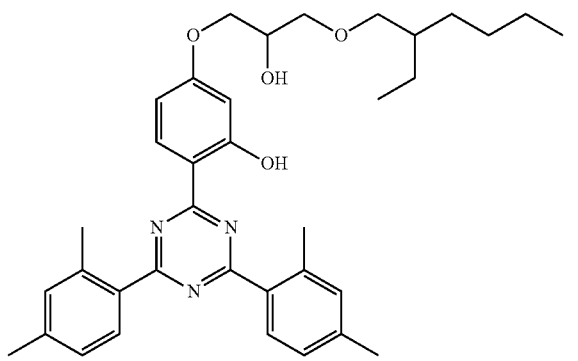

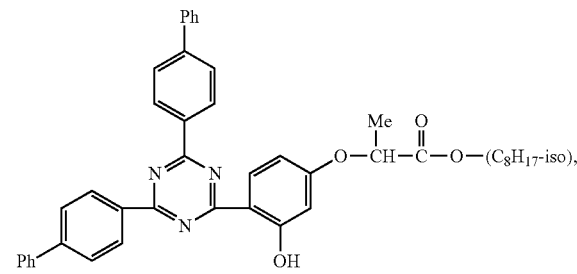

wherein the polymeric composition contains from 0.1 wt % to 5 wt % of the triazine and the polymeric composition is characterized by an increase in breakdown strength compared to breakdown strength of a comparative polymeric composition comprising the polyolefin and a triazine having the following structure:

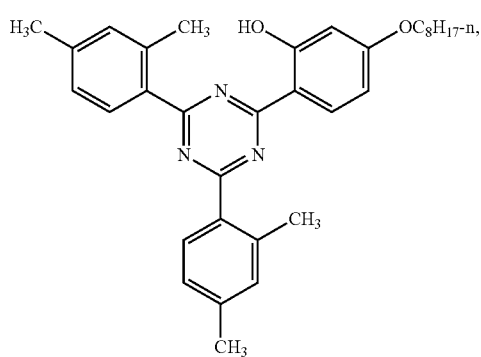

both when tested according to DC Breakdown Strength Measurement.

2. The coated conductor of claim 1, wherein said polymeric composition is in direct contact with said conductor.

3. The coated conductor of claim 1, wherein said triazine consists of the compound having structure (I).

4. The coated conductor of claim 1, wherein said triazine consists of the compound having structure (II).

5. The coated conductor of claim 1, wherein said triazine consists of the compound having structure (III).

6. The coated conductor of claim 1 wherein said coated conductor is selected from the group consisting of a medium-voltage power cable, a high-voltage power cable, and an extra-high-voltage power cable.

7. The coated conductor of claim 1, wherein said inner layer is an insulating layer.

8. The coated conductor of claim 1, wherein said inner layer is a shielding layer.

* * * * *